United States Patent
Chen et al.

(10) Patent No.: US 10,394,485 B1
(45) Date of Patent: Aug. 27, 2019

(54) STORAGE SYSTEM WITH EFFICIENT RE-SYNCHRONIZATION MODE FOR USE IN REPLICATION OF DATA FROM SOURCE TO TARGET

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/940,370

(22) Filed: Mar. 29, 2018

(51) Int. Cl.
G06F 3/06 (2006.01)
(52) U.S. Cl.
CPC ............ G06F 3/065 (2013.01); G06F 3/0604 (2013.01); G06F 3/067 (2013.01)
(58) Field of Classification Search
CPC ......... G06F 3/065; G06F 3/0604; G06F 3/067
See application file for complete search history.

(56) References Cited

U.S. PATENT DOCUMENTS

| | | | |
|---|---|---|---|
| 5,940,826 A * | 8/1999 | Heideman | G06F 9/526 |
| 7,444,464 B2 | 10/2008 | Urmston et al. | |
| 8,095,726 B1 | 1/2012 | O'Connell et al. | |
| 8,214,612 B1 * | 7/2012 | Natanzon | G06F 11/1612 |
| | | | 707/622 |
| 8,631,209 B2 * | 1/2014 | Serlet | G06F 16/137 |
| | | | 711/142 |
| 8,762,353 B2 * | 6/2014 | Carpentier | G06F 3/0641 |
| | | | 707/698 |
| 9,104,326 B2 * | 8/2015 | Frank | G06F 3/061 |
| 9,110,964 B1 * | 8/2015 | Shilane | G06F 16/178 |

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Ramon A. Mercado
(74) *Attorney, Agent, or Firm* — Ryan, Mason & Lewis, LLP

(57) ABSTRACT

A target storage system in one embodiment receives from a source storage system a plurality of content-based signatures of respective data pages of a storage object that is subject to replication from the source storage system to the target storage system. For a given one of the received content-based signatures having a particular logical address, the target storage system compares at least a portion of the received content-based signature with a particular one of a plurality of entries of an address-to-signature table maintained by the target storage system. Responsive to a match between at least a portion of the received content-based signature and the particular one of the entries of the address-to-signature table, the received content-based signature is compared with a full content-based signature corresponding to the particular entry, and responsive to a match between the received content-based signature and the full content-based signature corresponding to the particular entry, an indication of successful re-synchronization is provided to the source storage system for the storage object data page having the received content-based signature.

20 Claims, 10 Drawing Sheets

(56) References Cited

U.S. PATENT DOCUMENTS

| | | | |
|---|---|---|---|
| 9,208,162 B1 | 12/2015 | Hallak et al. | |
| 9,286,003 B1 | 3/2016 | Hallak et al. | |
| 9,378,106 B1* | 6/2016 | Ben-Moshe | G06F 11/2094 |
| 9,606,870 B1 | 3/2017 | Meiri et al. | |
| 9,690,823 B2* | 6/2017 | Cowling | G06F 16/27 |
| 9,716,754 B2 | 7/2017 | Swift | |
| 9,858,300 B2* | 1/2018 | Yochai | G06F 16/2255 |
| 10,152,527 B1* | 12/2018 | Meiri | G06F 16/2255 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0181016 A1 | 6/2014 | Whitehead et al. | |
| 2014/0181119 A1* | 6/2014 | Chiueh | G06F 16/137 707/747 |
| 2016/0150012 A1 | 5/2016 | Barszczak et al. | |
| 2016/0202927 A1 | 7/2016 | Klarakis et al. | |
| 2016/0224259 A1 | 8/2016 | Ahrens et al. | |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

Itzikr, "DellEMC XtremIO X2 Tech Preview #2—Native Replication," https://xtremio.me/2017/05/09/dellemc-xtremio-x2-tech-preview-2-native-replication/, May 9, 2017, 8 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

U.S. Appl. No. 15/662,708 filed in the name of Xianping Chen et al. filed Jul. 28, 2017 and entitled "Token-Based Data Flow Control in a Clustered Storage System."

U.S. Appl. No. 15/662,809 filed in the name of William Stronge et al. filed Jul. 28, 2017 and entitled "Automatic Verification of Asynchronously Replicated Data."

U.S. Appl. No. 15/662,833 filed in the name of William Stronge et al. filed Jul. 28, 2017 and entitled "Signature Generator for Use in Comparing Sets of Data in a Content Addressable Storage System."

U.S. Appl. No. 15/793,121 filed in the name of David Meiri et al. filed Oct. 25, 2017 and entitled "Opportunistic Compression of Replicated Data in a Content Addressable Storage System."

U.S. Appl. No. 15/793,147 filed in the name of Ernesto Blanco et al. filed Oct. 25, 2017 and entitled "Compression Signaling for Replication Process in a Content Addressable Storage System."

U.S. Appl. No. 15/872,553 filed in the name of Svetlana Kronrod et al. filed Jan. 16, 2018 and entitled "Storage System with Consistent Termination of Data Replication Across Multiple Distributed Processing Modules."

U.S. Appl. No. 15/824,536 filed in the name of Christopher Sayles et al. filed Nov. 28, 2017 and entitled "Storage System with Asynchronous Messaging Between Processing Modules for Data Replication."

U.S. Appl. No. 15/819,666 filed in the name of Xiangping Chen et al. filed Nov. 21, 2017 and entitled "Storage System Configured for Controlled Transition Between Asynchronous and Synchronous Replication Modes."

U.S. Appl. No. 15/876,433 filed in the name of Xiangping Chen et al. filed Jan. 22, 2018 and entitled "Storage System with Consistent Initiation of Data Replication Across Multiple Distributed Processing Modules."

* cited by examiner

STORAGE SYSTEM WITH EFFICIENT RE-SYNCHRONIZATION MODE FOR USE IN REPLICATION OF DATA FROM SOURCE TO TARGET

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Source site and target site storage systems can therefore each be configured to support both asynchronous and synchronous replication modes.

Conventional approaches to data replication can be problematic under certain conditions. For example, communication link failures or other types of failures occurring during synchronous replication can make it difficult to preserve target replica consistency without undermining system performance. In situations of this type, it may be necessary to perform a time-consuming full data re-synchronization of replicated storage objects between the source and target storage systems. Techniques are therefore needed that can provide significantly more efficient re-synchronization in these and other situations.

SUMMARY

Illustrative embodiments provide techniques for efficient re-synchronization between source and target storage systems in conjunction with a replication process in an information processing system. Such embodiments can advantageously provide substantially more efficient re-synchronization than conventional approaches. For example, in some embodiments, excessive changes in reference counts and other metadata are avoided for data pages that are already the same in both source and target storage systems. The amount of time and system resources required for re-synchronization is therefore substantially reduced.

These embodiments illustratively include a clustered implementation of a content addressable storage system having a distributed storage controller. Similar advantages can be provided in other types of storage systems.

In one embodiment, an apparatus comprises a storage system configured to participate as a target storage system in a replication process with a source storage system. In conjunction with a re-synchronization mode of the replication process, the target storage system receives from the source storage system a plurality of content-based signatures of respective data pages of a storage object that is subject to replication from the source storage system to the target storage system. For a given one of the received content-based signatures having a particular logical address, the target storage system compares at least a portion of the received content-based signature with a particular one of a plurality of entries of an address-to-signature table maintained by the target storage system. The particular entry of the address-to-signature table to which the received content-based signature is compared is the entry corresponding to the particular logical address, and illustratively comprises that logical address and an associated hash handle.

Responsive to a match between at least a portion of the received content-based signature and the particular one of the entries of the address-to-signature table, the received content-based signature is compared with a full content-based signature corresponding to the particular entry, and responsive to a match between the received content-based signature and the full content-based signature corresponding to the particular entry, an indication of successful re-synchronization is provided to the source storage system for the storage object data page having the received content-based signature.

Similar processing is performed by the target storage system for each of the other received content-based signatures, and possibly for other sets of content-based signatures for data pages of other storage objects.

The indication of successful re-synchronization is illustratively provided by the target storage system to the source storage system for the storage object data page having the received content-based signature without the target storage system updating a reference count maintained in metadata for that content-based signature.

In some embodiments, the target storage system maintains a counter indicating a number of consecutive successful re-synchronization indications provided for respective ones of the received content-based signatures. The target storage system controls one or more characteristics of the re-synchronization mode based at least in part on a current value of the counter relative to a designated threshold.

The source and target storage systems illustratively comprise respective content addressable storage systems having respective sets of non-volatile memory storage devices. For example, the storage devices of the source and target storage systems in such embodiments can be configured to collectively provide respective all-flash storage arrays. The source and target storage systems may be associated with respective source and target sites of the replication process. For example, the source site may comprise a production site data center and the target site may comprise a disaster recovery site data center. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
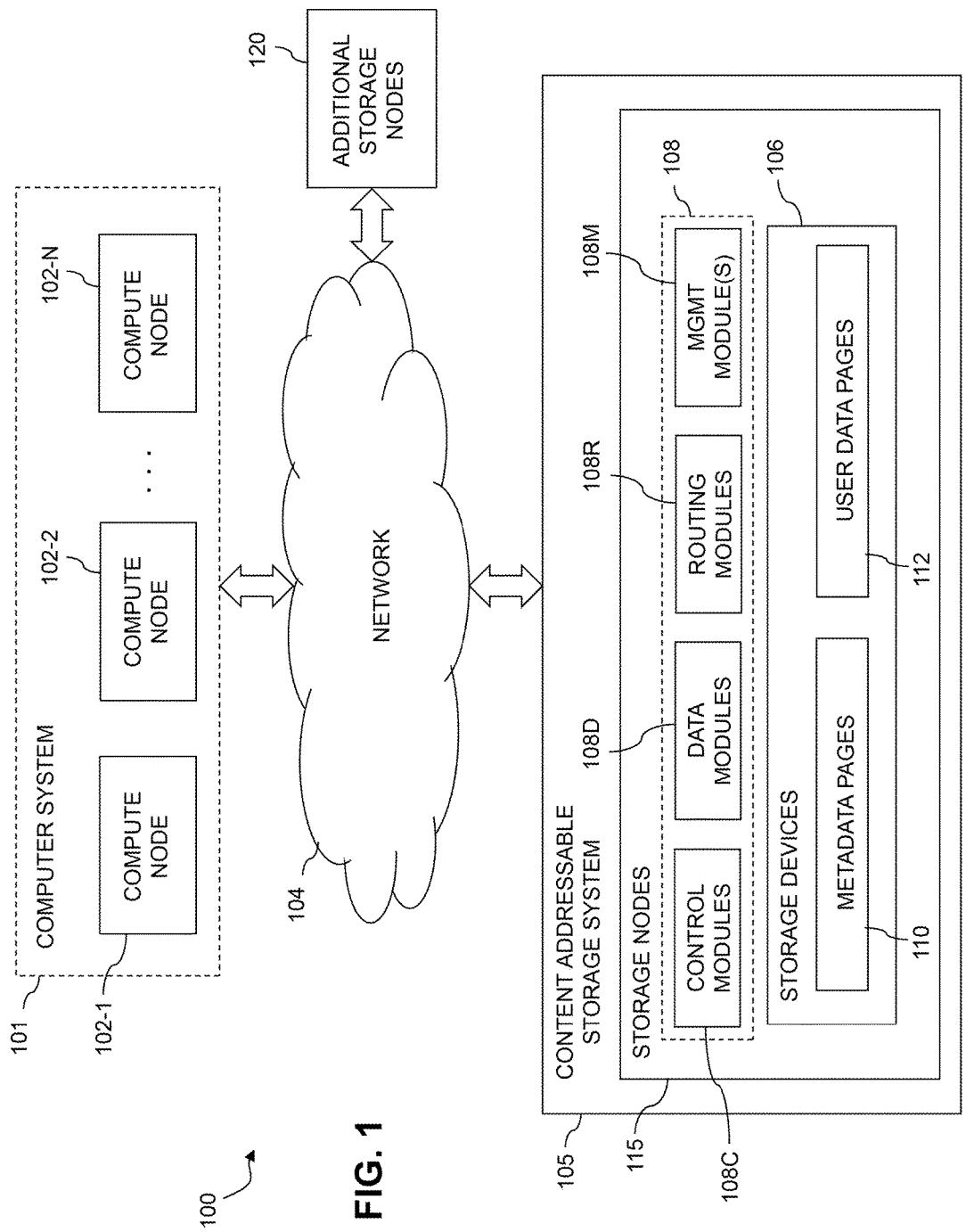
FIG. 1 is a block diagram of an information processing system comprising a content addressable storage system configured with functionality for efficient re-synchronization in a replication process in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the content addressable storage system 105. The compute nodes 102 and the content addressable storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAXx storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
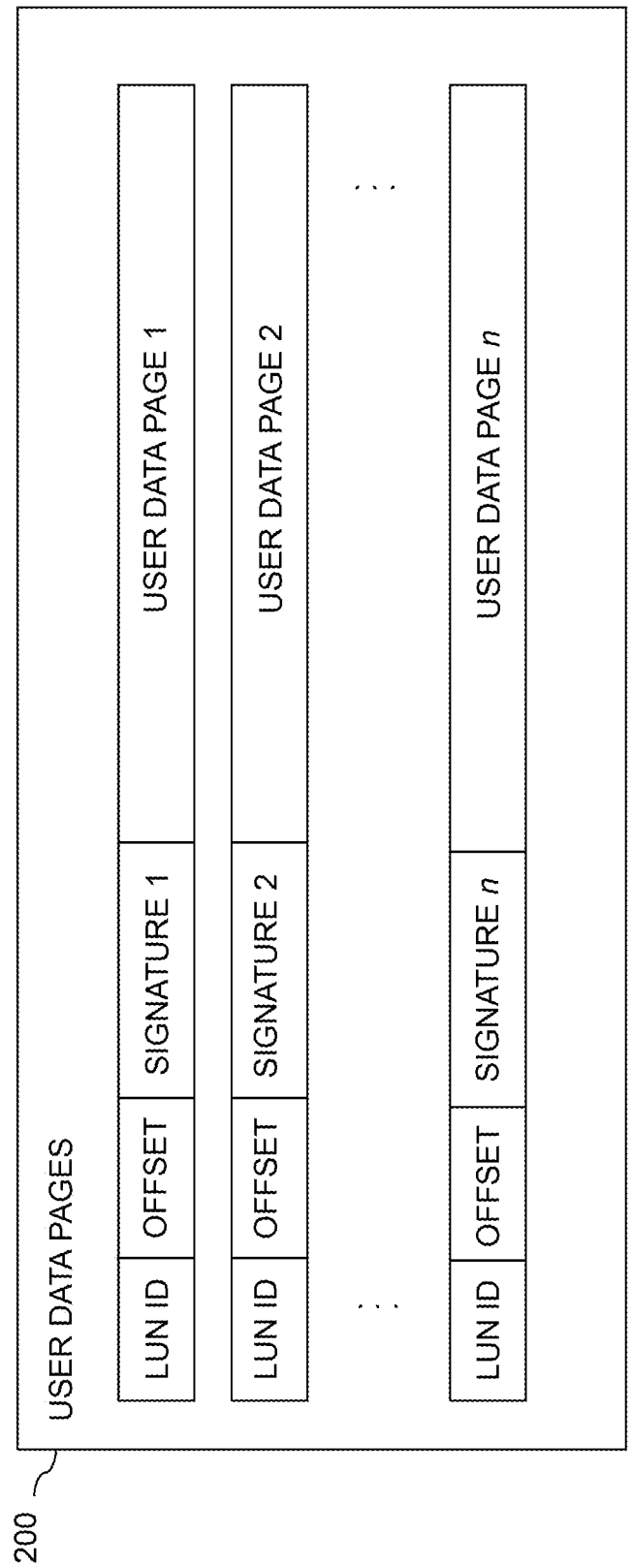
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
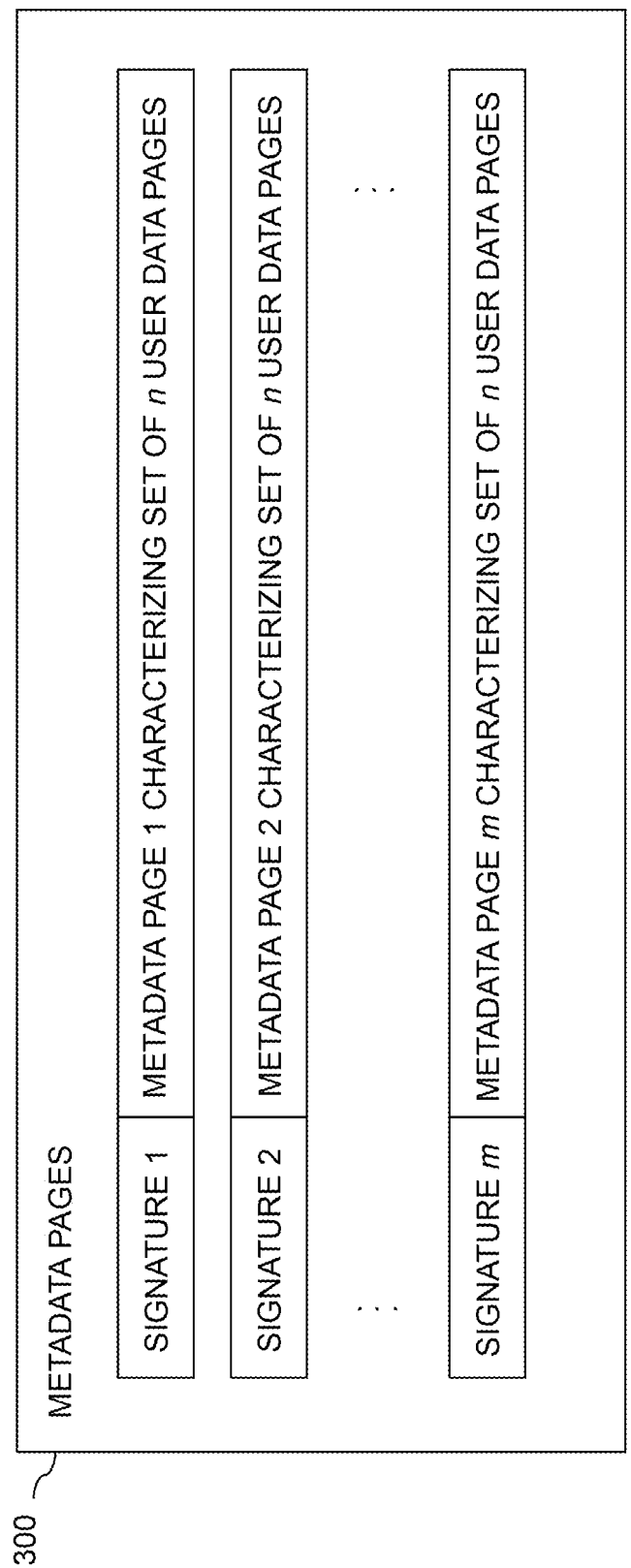
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for one or more replication processes carried out between the content addressable storage system 105 and another storage system. The term "replication process" as used herein is intended to be broadly construed, so as to encompass a single replication process that includes separate asynchronous and synchronous replication modes, as well as a replication process that includes multiple separate asynchronous and synchronous replication processes. In an arrangement of the latter type, the asynchronous and synchronous replication processes are also considered examples of what are more generally referred to herein as respective asynchronous and synchronous "replication modes." A given replication process as that term is generally used herein can in some cases include either a synchronous replication mode or an asynchronous replication mode, and no other replication modes.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links are established between the various processing modules of the distributed storage controller 108 using well-known communication protocols such as Transmission Control Protocol (TCP) and Internet Protocol (IP). For example, respective sets of IP links used in replication data transfer could be associated with respective different ones of the routing modules 108R and each such set of IP links could include a different bandwidth configuration.

Ownership of a user data logical address space within the content addressable storage system 105 is illustratively distributed among the control modules 108C. The management module 108M may include a replication engine or other arrangement of replication control logic that engages corresponding replication control logic instances in all of the control modules 108C and routing modules 108R in order to implement a data replication process within the system 100, as will be described in more detail below in conjunction with FIG. 4. The data replication process illustratively involves replicating data from one portion of a storage system to another portion of that system, or from one storage system to another storage system. It is desirable in these and other data replication contexts to implement efficient re-synchronization functionality in conjunction with a replication process performed across multiple distributed processing modules, such as the control modules 108C of the distributed storage controller 108.

In some embodiments, the content addressable storage system 105 comprises an XtremIO™ storage array suitably modified to incorporate efficient re-synchronization techniques as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, re-synchronization functionality in some embodiments is implemented under the control of at least one system-wide management module of the distributed storage controller 108.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module and D-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

The content addressable storage system 105 in the FIG. 1 embodiment is assumed to be configured to participate in a replication process with a second storage system that is not explicitly shown in the figure. The content addressable storage system 105 is an example of what is referred to herein as a "first storage system" relative to the second storage system. In certain description below, the content addressable storage system 105 will therefore be referred to as the first storage system. Each of the first and second storage systems comprises a plurality of storage devices, such as flash-based storage devices. The first and second storage systems are also referred to herein as respective "source" and "target" storage systems.

The replication process illustratively includes both synchronous and asynchronous replication modes. The synchronous replication mode involves mirroring host writes from the first storage system to the second storage system, while the asynchronous replication mode utilizes cycle-based asynchronous replication. Other types of synchronous and asynchronous replication modes and processes can be used in other embodiments.

More particularly, in this embodiment, the storage controller of the first storage system comprises replication control logic configured to cooperatively interact with corresponding replication control logic in a storage controller of the second storage system in order to execute at least a synchronous replication process carried out between the first and second storage systems. The second storage system can be implemented on the same processing platform as the first storage system or on a different processing platform. The replication control logic of a given one of the first and second storage systems may comprise software, hardware or firmware, or combinations thereof, implemented in one or more storage node processing modules, such as control modules, data modules, routing modules and management modules of a distributed storage controller of the corresponding storage system.

The first and second storage system in this embodiment are further assumed to be implemented as respective clustered storage systems each having a plurality of storage nodes implementing a distributed storage controller such as distributed storage controller 108 of content addressable storage system 105.

Each of the storage nodes of the first storage system comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of a distributed storage controller of the first storage system, such as the distributed storage controller 108. The storage nodes of the second storage system are assumed to be configured in a similar manner.

In an illustrative embodiment, one or more replication failure conditions are detected that require the first and second storage systems to enter a re-synchronization mode of operation. The first and second storage systems are configured to participate as respective source and target storage systems in the replication process.

In conjunction with the re-synchronization mode of the replication process, the target storage system is further configured to receive from the source storage system a plurality of content-based signatures of respective data pages of a storage object that is subject to replication from the source storage system to the target storage system.

For a given one of the received content-based signatures having a particular logical address, the target storage system compares at least a portion of the received content-based signature with a particular one of a plurality of entries of an address-to-signature table maintained by the target storage system. The particular entry of the address-to-signature table to which the received content-based signature is compared is the entry corresponding to the particular logical address, and illustratively comprises that logical address and an associated hash handle.

Responsive to a match between at least a portion of the received content-based signature and the particular one of the entries of the address-to-signature table, the target storage system compares the received content-based signature with a full content-based signature corresponding to the particular entry.

Responsive to a match between the received content-based signature and the full content-based signature corresponding to the particular entry, the target storage system provides an indication of successful re-synchronization to the source storage system for the storage object data page having the received content-based signature.

The address-to-signature table is illustratively maintained by one of the control modules 108C of the distributed storage controller 108, and the full content-based signature corresponding to the particular entry is obtained from one of the data modules 108D of the distributed storage controller 108.

Advantageously, the indication of successful re-synchronization is provided to the source storage system for the storage object data page having the received content-based signature without the target storage system updating a reference count maintained in metadata for that content-based signature.

In some embodiments, the target storage system is further configured to provide an indication of unsuccessful re-synchronization to the source storage system for the storage object data page having the received content-based signature, for example, responsive to one of an absence of a match between at least a portion of the received content-based signature and the particular one of the entries of the address-to-signature table and an absence of a match between the received content-based signature and the full content-based signature corresponding to the particular entry.

The target storage system illustratively receives from the source storage system, responsive to receipt by the source storage system of the above-noted indication of unsuccessful re-synchronization for the storage object data page having the received content-based signature, all content of that data page.

The address-to-signature table maintained by the target storage system may comprise at least one address-to-hash table of the target storage system. The entries of the address-to-hash table comprise respective ones of a plurality of logical addresses in association with respective hash handles corresponding to respective ones of the content-based signatures.

The comparison of at least a portion of the received content-based signature with the particular one of a plurality of entries of an address-to-signature table maintained by the target storage system may be triggered responsive to generation in the target storage system of a local write-via-hash operation for the received content-based signature. The generation in the target storage system of the local write-via-hash operation may be triggered responsive to receipt of the content-based signature from the source storage system in conjunction with the re-synchronization mode of the replication process.

If the local write-via-hash operation fails, the target storage system illustratively provides an indication of unsuccessful re-synchronization to the source storage system for the storage object data page having the received content-based signature. This may occur responsive to one of an absence of a match between at least a portion of the received content-based signature and the particular one of the entries of the address-to-signature table and an absence of a match between the received content-based signature and the full content-based signature corresponding to the particular entry.

In some embodiments, the target storage system maintains a counter indicating a number of consecutive successful re-synchronization indications provided for respective ones of the received content-based signatures. One or more characteristics of the re-synchronization mode may then be controlled based at least in part on a current value of the counter relative to a designated threshold.

Figure 4:
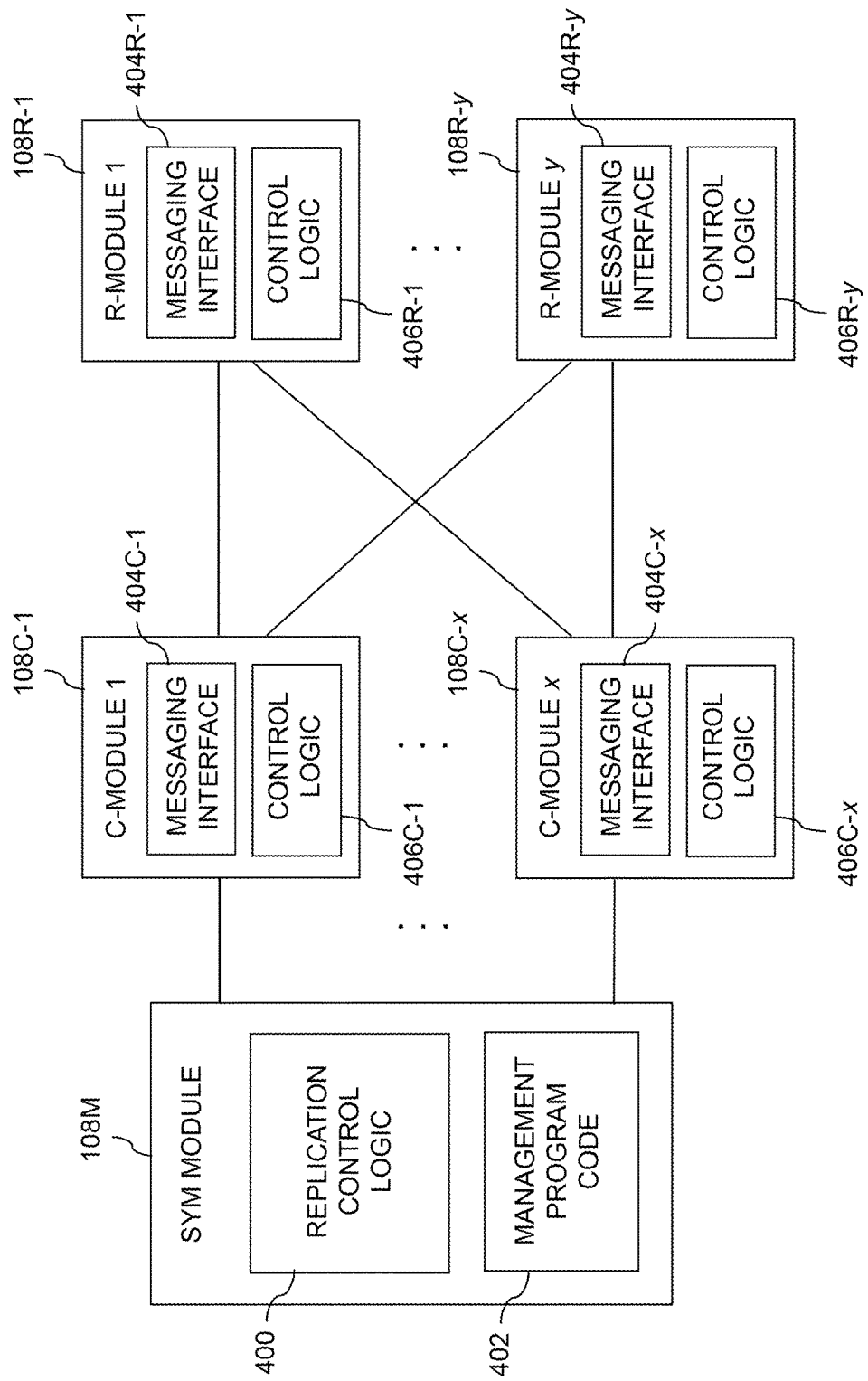
FIG. 4 illustrates a portion of a distributed storage controller of a content addressable storage system showing one possible arrangement supporting efficient re-synchronization of source and target storage systems across multiple processing modules of the distributed storage controller.

Referring now to FIG. 4, a more detailed view of a portion of the distributed storage controller 108 in an illustrative embodiment is shown. This embodiment illustrates an example of communications between control modules 108C and routing modules 108R of the distributed storage controller 108.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises replication control logic 400 and associated management program code 402. The management module 108M communicates with control modules 108C-1 through 108C-x, also denoted as C-module 1 through C-module x. The control modules 108C communicate with routing modules 108R-1 through 108R-y, also denoted as R-module 1 through R-module y. The variables x and y are arbitrary integers greater than one, and may but need not be equal. In some embodiments, each of the storage nodes 115 of the content addressable storage system 105 comprises one of the control modules 108C and one of the routing modules 108R, as well as one or more additional modules including one of the data modules 108D.

The control modules 108C-1 through 108C-x in the FIG. 4 embodiment comprise respective messaging interfaces 404C-1 through 404C-x. These messaging interfaces 404C are utilized by corresponding instances of replication control logic 406C-1 through 406C-x to generate, receive and otherwise process messages in conjunction with a replication process. For example, the messaging interfaces 404C are utilized to generate control-to-routing messages for transmission to the routing modules 108R, and to process routing-to-control messages received from the routing modules 108R. The messaging interfaces 404C also generate messages for transmission to the management module 108M and process instructions and other messages received from the management module 108M.

The replication process is assumed to comprise a synchronous replication process in which write requests directed by one or more host devices to the first storage system are mirrored to the second storage system. More particularly, when a synchronous replication process is enabled for a particular data item or set of data items, the first storage system mirrors host writes to the data item or data items to the second storage system as part of handling those host writes, and only responds to an initiating host after receiving acknowledgement of successful replication from the second storage system.

The term "write request" as used herein is intended to be broadly construed, so as to encompass one or more input-output (10) operations directing that at least one data item of a storage system be written to in a particular manner. A given write request is illustratively received in a storage system from a host device. For example, in some embodiments, a write request is received in a distributed storage controller of the storage system, and directed from one processing module to another processing module of the distributed storage controller. More particularly, in the embodiment to be described below in conjunction with FIG. 5B, a received write request is directed from a routing module of a source site storage system to a control module of the source site storage system. Other arrangements for receiving and processing write requests from one or more host devices can be used.

The replication process can additionally include a cycle-based asynchronous replication process in which the control modules 108C scan differences in designated replication data between replication cycles, and send corresponding data transfer requests as needed to the routing modules 108R. The routing modules 108R in turn replicate the data to a remote storage node cluster of the second storage system, and then respond to the control modules 108C regarding the data replication results.

The routing modules 108R-1 through 108R-y in the FIG. 4 embodiment comprise respective messaging interfaces 404R-1 through 404R-y. These messaging interfaces 404R are utilized by corresponding instances of replication control logic 406R-1 through 406R-y to generate routing-to-control messages for transmission to one or more of the control modules 108C and to process control-to-routing messages received from one or more of the control modules 108C in conjunction with the replication process.

For example, as indicated above, a given one of the control modules 108C may be configured to generate a request message as a control-to-routing message for transmission to a given one of the routing modules 108R requesting that the given routing module transfer designated replication data to the second storage system.

The manner in which re-synchronization functionality is provided in conjunction with a replication process of the FIG. 4 embodiment will now be described. The replication process is assumed to be carried out by the processing modules 108C, 108D, 108R and 108M. It is further assumed that the control modules 108C write data pages in the content addressable storage system 105 via the data modules 108D in accordance with write requests received from host devices via the routing modules 108R. The host devices illustratively comprise respective ones of the compute nodes 102 of the computer system 101.

The write requests from the host devices identify particular data pages to be written in the storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 105. The A2H table is considered one possible type of an address-to-signature table as that latter term is broadly used herein.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

Execution of a given write request received in the storage system 105 from a host device illustratively involves the following operations:

1. Receive the write request in a particular control module 108C from a particular routing module 108R.

2. Acquire CIO address range lock for the logical address range to be written, where CIO refers to an IO process component in the control module 108C. As noted above, the control modules have ownership of particular logical address spaces, and the CIO address therefore denotes a global logical address for a given storage block.

3. Perform a read-modify operation if the write is a small or unaligned write. Examples of read-modify operations for use with small or unaligned writes can be found in the above-cited U.S. Pat. No. 9,104,326.

4. Write the data pages to a data module 108D, based on a hash-to-data ("H2D") table. New hash handles are generated for the respective data pages, and reference counts associated with the new hash handles are incremented.

5. Release the CIO address range lock.

6. Send a response back to the requesting routing module 108R.

7. Decrement reference counts associated with the old hash handles of respective data pages that have been overwritten. These are examples of what are more generally referred to herein as "dereferencing operations."

The reference counts mentioned above are illustratively maintained for respective physical blocks in the storage devices 106 and each such reference count indicates for its corresponding physical block the number of logical blocks that point to that same physical block. When all logical block references to a given physical block are removed, the reference count for that physical block becomes zero and its capacity can be released. A given "dereferencing operation" as that term is broadly used herein is intended to encompass decrementing of a reference count associated with a physical block.

In conjunction with release of logical address space in the content addressable storage system 105, the storage controller 108 makes the released logical address space available to users, executes dereferencing operations for respective ones of the physical blocks corresponding to the released logical address space, and releases any physical capacity for which the corresponding reference counts reach zero.

The logical address space illustratively comprises one or more ranges of logical block addresses or LBAs each comprising a LUN ID and an offset. For example, each LBA can identify a particular one of the user data pages 200. The LBAs each correspond to one or more physical blocks in the storage devices 106. Other types of LBAs and logical address spaces can be used in other embodiments. The term "logical address" as used herein is therefore intended to be broadly construed.

A given such logical address space may be released responsive to deletion of a corresponding storage volume, snapshot or any other arrangement of data stored in the storage system 105. Other conditions within the storage system 105 can also result in release of logical address space.

As indicated above, the storage controller 108 via its processing modules 108C, 108D, 108R and 108M is configured to implement re-synchronization functionality in the content addressable storage system 105.

In this embodiment, the storage controller 108 is configured to implement a logical storage layer in which logical blocks are associated with respective content-based signatures and a physical storage layer in which the content-based signatures are associated with respective physical blocks in the storage devices 106. As part of this process, the storage controller 108 maintains reference counts for respective ones of the physical blocks, with a given such reference count indicating a number of the logical blocks that map via their respective content-based signatures to the same physical block.

In conjunction with the replication process being carried out by the processing modules 108C, 108D, 108R and 108M, a particular one of the control modules 108C detects a replication failure condition for a given write request received from a host device. The host device is illustratively one of the compute nodes 102 of the computer system 101. The particular control module 108C provides a notification of the detected replication failure to the management module 108M.

The synchronous replication process in this embodiment is assumed to be configured such that the second storage system generates for each successfully mirrored write request a corresponding response back to the first storage system. This response generally comes from a routing module of the second storage system back to the particular control module that requested the data transfer for mirroring of the write request. The requesting control module would then normally provide a replication acknowledgement back to the host device that generated the write request, so as to indicate to the host device that the write request has been successfully mirrored to the second storage system.

The term "replication acknowledgement" as used herein is also intended to be broadly construed, so as to encompass any type of update, status report or other message that would ordinarily be provided by a processing module of a storage system to a host device responsive to a write request generated by that host device and directed to a data item that is subject to replication in the storage system.

The detected replication failure condition for the given write request therefore illustratively comprises a failure to receive in the requesting control module a corresponding response from the second storage system indicating that the given write request has been successfully mirrored to the second storage system. For example, the replication failure condition may be detected upon expiration of a specified timeout period without the expected successful mirroring response being received from the second storage system. The timeout period may be measured from transmission of a data transfer request from the requesting control module of the first storage system. Other types of replication failure conditions and failure detection mechanisms can be used in other embodiments.

The notification of the detected replication failure condition may be one of a plurality of such notifications received in the management module 108M from respective different ones of the control modules 108C.

Responsive to receipt of the notification of the detected replication failure condition, the management module 108M causes the replication process to enter a re-synchronization mode of operation.

As a more particular example in the XtremIO™ context, a process for efficient re-synchronization is implemented across multiple processing modules of a distributed storage controller.

The C-modules, D-modules and R-modules of the storage nodes in this context are assumed to be configured to communicate with one another over a high-speed internal network such as an InfiniBand (IB) network. The C-modules, D-modules and R-modules coordinate with one another to accomplish various IO processing tasks.

Communications between the modules may be subject to synchronous messaging timeout periods configured to ensure that host IO operations will not time out even if module failure recovery is needed in the distributed storage controller.

Additionally or alternatively, asynchronous messaging techniques may be used, such as those disclosed in U.S. patent application Ser. No. 15/824,536, filed Nov. 28, 2017 and entitled "Storage System with Asynchronous Messaging between Processing Modules for Data Replication," which is incorporated by reference herein. These asynchronous messaging techniques can avoid problems that could otherwise result if network issues cause data transfer between the source and target site storage systems to take a relatively long time. For example, undesirable timeouts in the replication data transfer messages exchanged between the C-modules and the R-modules can be more readily avoided.

It is assumed for purposes of the present example that data transfer request messages can be sent from any C-module to any R-module in the storage node cluster of the corresponding storage system. A given data transfer request message sent from a C-module to an R-module will receive an immediate response within a synchronous messaging timeout period. The response will usually be successful and the received data transfer request message will be processed by the R-module using a background thread. An error will be returned if there is something wrong with the message or if the R-module cannot process the message. Data transfer result responses will be sent back from the R-module to the C-module as separate messages.

The re-synchronization functionality in this particular example is more specifically implemented as follows.

It is assumed in this example that it is necessary for the source and target storage systems to enter a re-synchronization mode of operation. For example, synchronous replication data mirroring could be stopped due to a detected failure condition of the type previously described. Alternatively, replication context information may have been lost in an asynchronous replication process.

The re-synchronization algorithm in this example is configured to optimize a full data re-synchronization by avoiding metadata updates if the data are already the same on source and target. This optimization reduces the performance impact of full re-synchronization activity, and speeds up the replication recovery.

The re-synchronization algorithm proceeds in the following manner. The source storage system scans through all data blocks of a replication storage object, and sends a hash digest of each data block to the target storage system. The storage object may comprise a logical storage volume or set of logical storage volumes, and the data blocks may comprise respective data pages. The target storage system attempts to perform a local write-via-hash operation for all hash digests sent from the source storage system. However, the algorithm is more particularly configured to determine if the same data has already been written on the same logical address, which is very likely in the case of full data re-synchronization, and to avoid the actual write operation and reference count incrementing and decrementing.

This is achieved for a given local write-via-hash operation by the target storage system first reading the existing hash handle from the A2H table for the corresponding logical address, and then comparing the received hash digest for that logical address to the hash handle from the A2H table. If this first comparison results in a match, then it is likely that the source and target data are already the same in that logical address. The target storage system then generates a request to the appropriate data module for the full hash digest that is mapped to the hash handle in the A2H table, and compares the hash digest received from the source storage system to the full hash digest provided by the data module of the target storage system. If this second comparison results in a match, it is confirmed that the source and target data are the same in the logical address, and there is no need to perform an actual overwrite. Accordingly, the local write-via-hash operation concludes successfully without any writing of the target data, and an appropriate response is sent back to the source storage system.

If either the first or second comparison above does not result in a match, the write-via-hash operation fails. The target storage system sends a response back to the source storage system indicating that the local write-via-hash operation did not conclude successfully, which triggers the source storage system to send full data content for the corresponding data block to the target storage system. The target storage system will then handle this request from the source storage system as a regular write operation.

The above-described algorithm advantageously avoids unnecessary incrementing and decrementing of reference counts for cases in which source data for particular logical addresses is already the same as the target data for those logical addresses. This avoids excessive updating of metadata in conjunction with re-synchronization and helps to eliminate any associated negative performance impacts.

In some implementations of the algorithm, the target storage system could maintain a success_counter on a per-session basis of the number of consecutive data blocks for which successful "shortcut" optimization of the type described above was achieved. The success_counter provides an indication of a "streak" of consecutive data blocks for which it has been determined that the source and target data was already the same. The success_counter can be used to adjust various characteristics of the algorithm and its application, such as whether or not the algorithm continues to be utilized in a given re-synchronization. For example, the algorithm may be terminated if the success_counter does not remain above a designated threshold after the processing of a minimum number of data blocks. Other types of counters and thresholds can be used in other embodiments.

The example algorithm described above is executed at the source site utilizing replication control logic instances 400, 406C and 406R of the respective storage node processing modules 108M, 108C and 108R of the first storage system. Similar replication control logic instances in corresponding processing modules are implemented at the target site to execute target site portions of the algorithm.

It is to be appreciated that the particular algorithm steps are exemplary only, and can be varied in other embodiments.

Also, the particular interconnection and signaling arrangements illustrated for processing modules 108C, 108R and 108M in FIG. 4 are presented by way of example only, and can be varied in other embodiments.

In some embodiments, the replication control logic of these processing modules comprises at least a portion of a replication engine of the storage controller 108. An example of such a replication engine and its associated processing operations will be described in more detail below in conjunction with the embodiment of FIG. 6.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement re-synchronization functionality for data replication in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with re-synchronization functionality can be offered to cloud infrastructure customers or other users as a PaaS offering.

Additional details of illustrative embodiments will now be described with reference to FIGS. 5, 6 and 7. FIGS. 5 and 6 illustrate examples of information processing systems that each include a first content addressable storage system such as content addressable storage system 105 of the FIG. 1 embodiment that is configured to participate in a replication process with another storage system over at least one network.

In the context of the FIG. 5 embodiment, the storage systems participating in the replication process are assumed to be associated with respective source and target sites of the replication process. For example, the source site may comprise a production site data center and the target site may comprise a disaster recovery site data center. The FIG. 6 embodiment more generally refers to the storage systems participating in the replication process as respective first and second storage systems. The first and second storage systems illustratively comprise respective content addressable storage systems having respective sets of non-volatile memory storage devices, although other types of storage systems can be used.

Figure 5A:
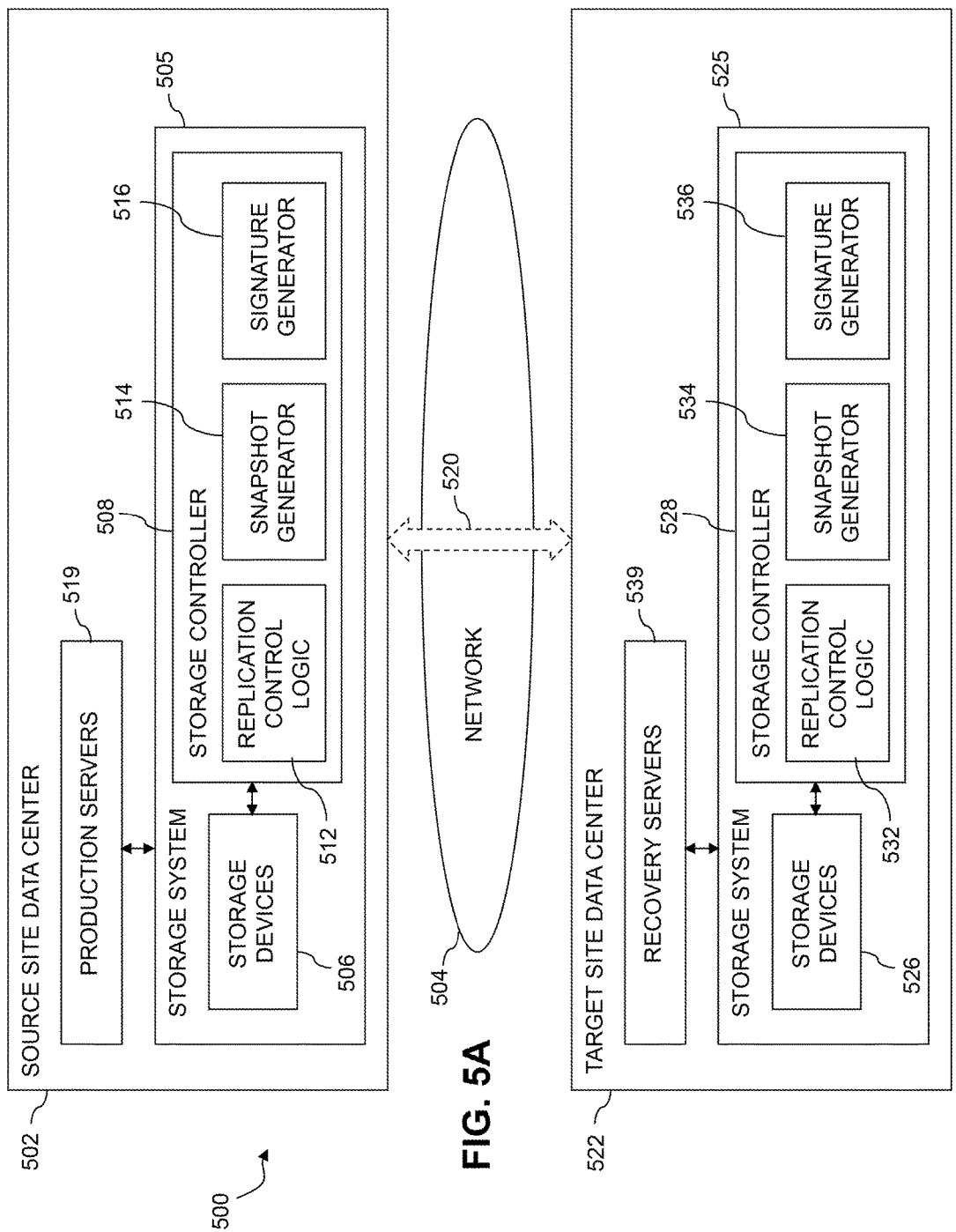
FIGS. 5A and 5B are block diagrams showing different views of an information processing system comprising source site and target site storage systems configured to participate in a replication process in an illustrative embodiment. These two figures are collectively referred to herein as FIG. 5.
Figure 5B:
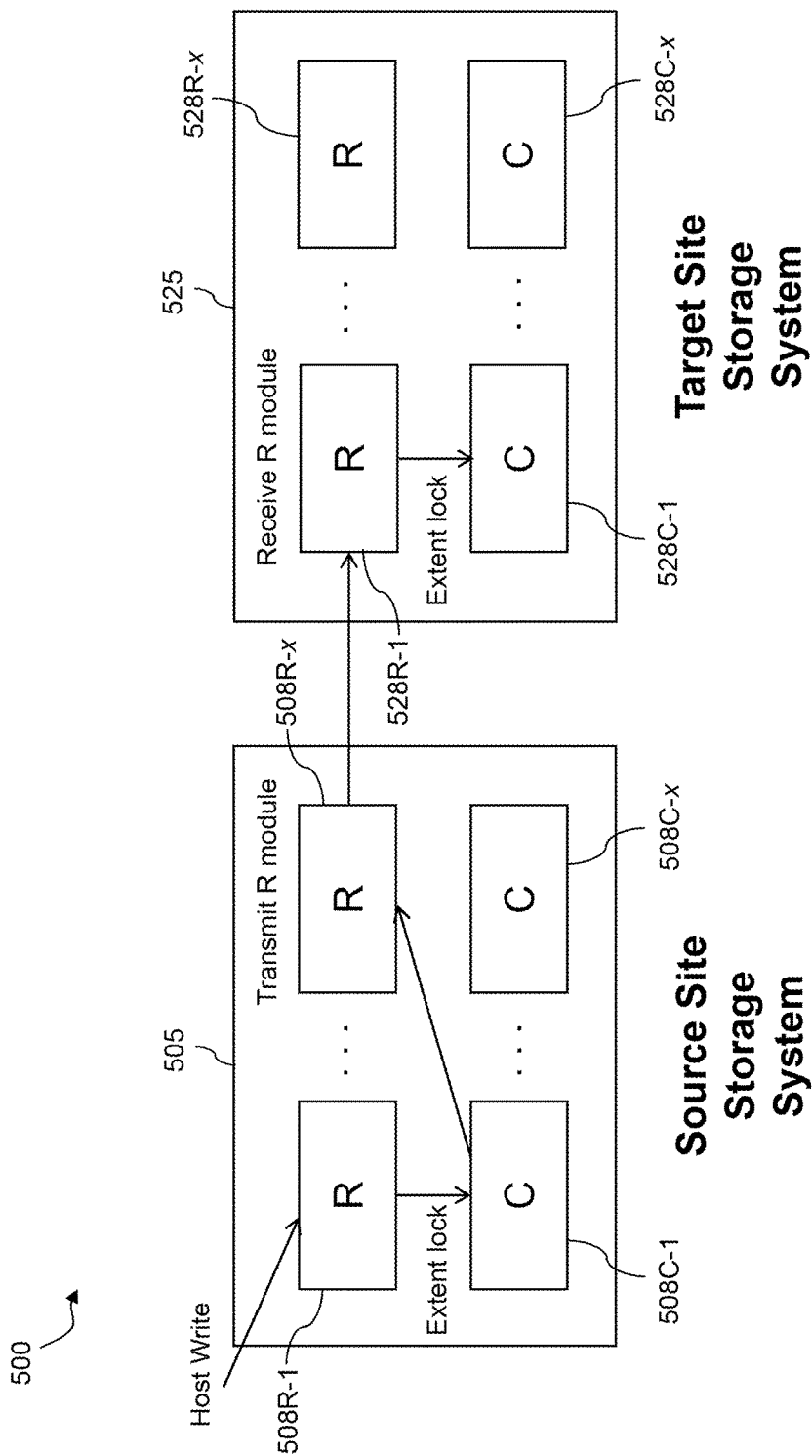
Figure 6:
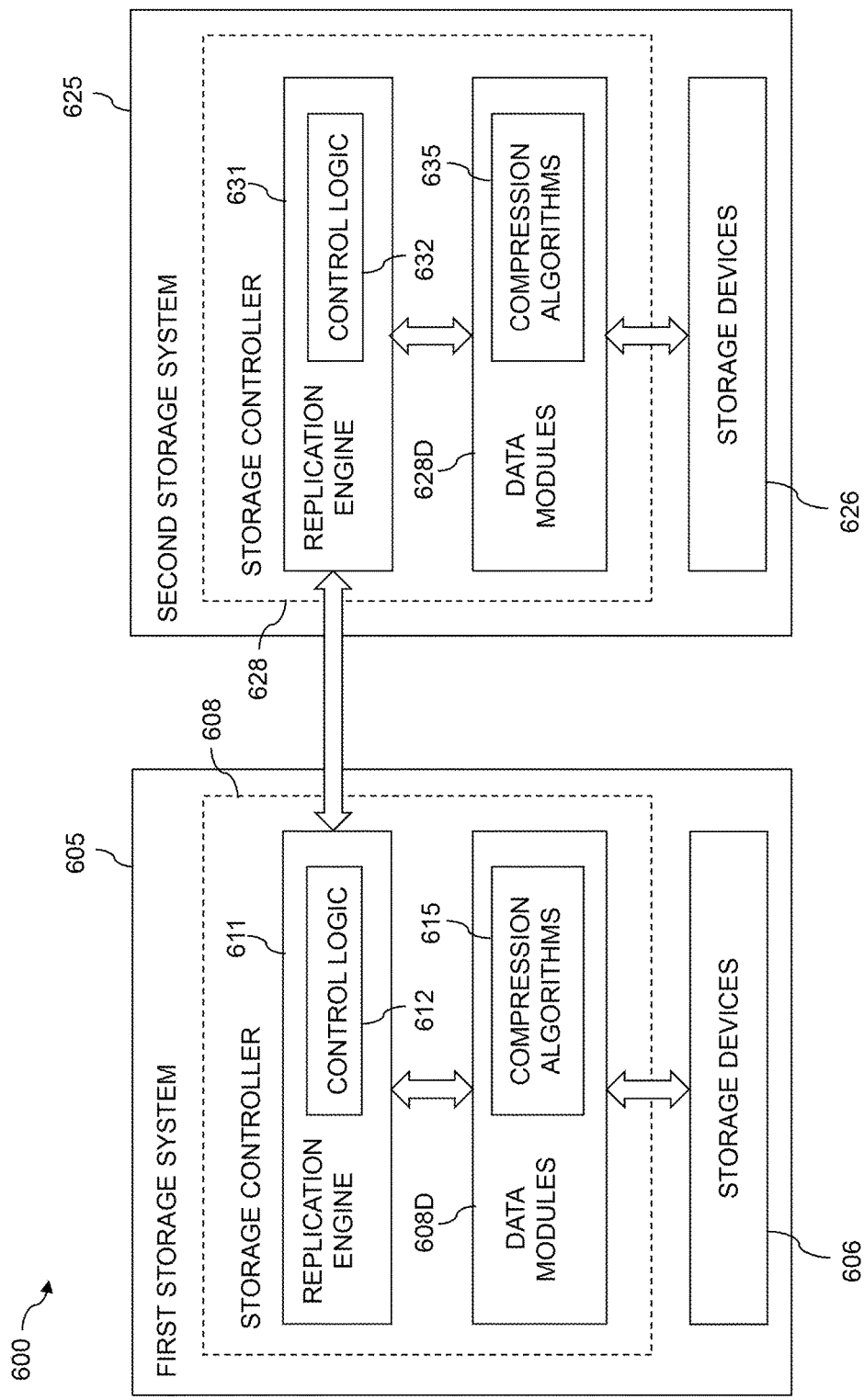
FIG. 6 illustrates interaction between replication engines implemented in respective storage controllers of respective first and second storage systems as part of a replication process in an illustrative embodiment.

As mentioned previously, FIG. 5 more particularly comprises two separate figures denoted FIG. 5A and FIG. 5B, each showing different views of respective portions of an information processing system.

Referring now to FIG. 5A, an information processing system 500 in an illustrative embodiment comprises a source site data center 502 coupled to at least one network 504. The source site data center 502 comprises a storage system 505 having storage devices 506 and an associated storage controller 508. The storage controller 508 comprises replication control logic 512, snapshot generator 514 and signature generator 516. The source site data center 502 further comprises a set of production servers 519 coupled to the storage system 505.

As indicated above, the storage system 505 in the present embodiment is assumed to comprise a content addressable storage system, although other types of storage systems can be used in other embodiments.

The source site data center 502 is coupled via one or more communication channels 520 of the network 504 to a target site data center 522 of the system 500. The target site data center 522 comprises a storage system 525. The storage system 525 comprises storage devices 526 and an associated storage controller 528. The storage controller 528 comprises replication control logic 532, snapshot generator 534 and signature generator 536.

The target site data center 522 further comprises a set of recovery servers 539 coupled to the storage system 525. The storage system 525, like the storage system 505, is assumed to comprise a content addressable storage system, although again other types of storage systems can be used in other embodiments.

The source site data center 502 and the target site data center 522 are examples of what are more generally referred to herein as respective ones of a "source site" and a "target site" of an information processing system. The source site data center 502 and the target site data center 522 will therefore also be referred to herein as respective source site 502 and target site 522 of the system 500. In some embodiments, the target site 522 comprises a disaster recovery site data center and the source site 502 comprises a production site data center, although other arrangements are possible.

The source site 502 and target site 522 may be implemented in respective distinct local and remote geographic locations, although it is also possible for the two sites to be within a common facility or even implemented on a common processing platform.

It is assumed that data is replicated in system 500 from the source site 502 to the target site 522 using a replication process that begins in an asynchronous replication mode, and subsequently transitions from the asynchronous replication mode to a synchronous replication mode. For example, the asynchronous replication mode may be used to replicate the bulk of a given set of data from the first storage system to the second storage system. The mirroring functionality of the synchronous replication mode is then enabled. Other arrangements utilizing different replication modes and different transitions between the modes are possible.

The synchronous replication mode in some embodiments is illustratively configured to mirror data writes between the first and second storage systems. For example, when a host device writes data to the first storage system, the first storage system responds to the host device with an acknowledgement of successful storage in the first storage system only after the first storage system sends the data to the second storage system and receives an acknowledgement of successful storage back from the second storage system.

The asynchronous replication mode in some embodiments implements cycle-based asynchronous replication to periodically transfer data in multiple cycles from the source site 502 to the target site 522. The data replicated from the source site 502 to the target site 522 can include all of the data stored in the storage system 505, or only certain designated subsets of the data stored in the storage system 505. Different replication processes of different types can be implemented for different parts of the stored data.

Further details regarding asynchronous replication processes suitable for use in illustrative embodiments herein can be found in U.S. patent application Ser. No. 15/662,809, filed Jul. 28, 2017 and entitled "Automatic Verification of Asynchronously Replicated Data," which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of data replication.

A given "replication process" as that term is broadly used herein may therefore include both asynchronous and synchronous replication modes as well as support for concurrent operation of such modes and separate operation of the individual modes. The term "mode" as used herein in conjunction with asynchronous or synchronous replication may therefore itself comprise a corresponding asynchronous or synchronous replication process.

Each of the source site 502 and target site 522 in the FIG. 5A embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, the storage controllers 508 and 528 or various components thereof can each be implemented in the form of one or more LXCs running on one or more VMs. Other arrangements of one or more processing devices of a processing platform can be used to implement the storage controllers 508 and 528 and/or their respective components. Other portions of the system 500 can similarly be implemented using one or more processing devices of at least one processing platform.

The source site 502 and target site 522 are illustratively implemented on respective distinct processing platforms, although numerous other arrangements are possible. For example, in some embodiments at least portions of the source site 502 and the target site 522 may be implemented on the same processing platform. The term "processing platform" as used herein is intended to be broadly construed so as to encompass, by way of illustration and without limitation, multiple sets of processing devices and associated storage systems that are configured to communicate over one or more networks.

Referring now to FIG. 5B, a more detailed view of a portion of the information processing system 500 is shown, including processing modules of distributed storage controllers of the source site storage system 505 and the target site storage system 525.

As illustrated, a portion of a distributed storage controller of the source site storage system 505 comprises a plurality of control modules 508C-1 through 508C-x and a plurality of routing modules 508R-1 through 508R-x. The distributed storage controller of the storage system 505 is assumed to further comprise a plurality of data modules and at least one management module, although these additional processing modules are not shown in the figure for clarity and simplicity of illustration.

Similarly, a portion of a distributed storage controller of the target site storage system 525 comprises a plurality of control modules 528C-1 through 528C-x and a plurality of routing modules 528R-1 through 528R-x. The distributed storage controller of the storage system 525 is also assumed to further comprise a plurality of data modules and at least one management module, although these additional processing modules are not shown in the figure.

Also illustrated in FIG. 5B is a portion of a messaging flow associated with a particular host write that is to be replicated from the source site storage system 505 ("source") to the target site storage system 525 ("target") as part of a synchronous replication process or synchronous replication mode of the system 500.

The synchronous replication process flow for the given host write in this embodiment illustratively comprises the following steps:
1. Host write
2. Extent lock at source
3. Write at source
4. Transmit to target
5. Receive in target
6. Extent lock at target
7. Write at target
8. Release extent lock at target
9. Return status to source
10. Update A2H locally at source
11. Release extent lock at source
12. Return status to host In the figure, steps 1, 2 and 4-6 are illustrated by arrows. The extent lock refers to locking of a particular address range in conjunction with the host write. The A2H updated in step 10 is an address-to-hash ("A2H") table that provides a mapping between logical addresses and corresponding content-based signatures of respective data pages. As the host write illustratively changes content of one or more such data pages, the content-based signatures and associated A2H table are updated in conjunction with the host write.

An example of a replication failure condition in this embodiment is a failure of the transmitting control module 508C-1 to receive an expected response from the target site storage system 525 as part of the status report in step 9 above indicating that the given host write has been successfully mirrored to the target site storage system 525. Upon detection of such a replication failure condition, the control module 508C-1 provides a notification to a management module of the source site storage system 505.

One or more messages associated with returning status back to the host in step 12 of the synchronous replication messaging flow may therefore be viewed as an example of what is more generally referred to herein as a "replication acknowledgement."

The other control modules 508C will operate in a similar manner to that described above for control module 508C-1, as instructed by the management module.

Again, it is to be appreciated that these and other features of illustrative embodiments are presented by way of example only, and should not be construed as limiting in any way. Accordingly, different numbers, types and arrangements of system components such as source and target sites 502 and 522 and their respective storage systems 505 and 525 and storage controllers 508 and 528 can be used in other embodiments. In these other embodiments, only subsets of these components, or additional or alternative sets of components, may be used, and such components may exhibit alternative functionality and configurations.

The replication process carried out between the source site storage system 505 and the target site storage system 525 in the FIG. 5 embodiment utilizes re-synchronization techniques of the type previously described in conjunction with the content addressable storage system 105 of FIG. 1. Examples of such re-synchronization arrangements will now be described in further detail with reference to FIGS. 6 and 7.

Turning now to FIG. 6, an information processing system 600 comprises a first storage system 605 comprising storage devices 606 and a distributed storage controller 608. The distributed storage controller 608 comprises a plurality of data modules 608D and a replication engine 611 having control logic 612. The data modules 608D implement compression algorithms 615 for compressing data in conjunction with storage of the data in the storage devices 606. The replication engine 611 and its associated control logic 612 may be implemented at least in part in one or more control modules and/or management modules of the distributed storage controller 608, although such modules are not explicitly shown in the figure. The distributed storage controller 608 may be viewed as corresponding to an instance of storage controller 108 of FIG. 1 or storage controller 508 or 528 of FIG. 5.

The information processing system 600 further comprises a second storage system 625 comprising storage devices 626 and a distributed storage controller 628. The distributed storage controller 628 comprises a plurality of data modules 628D and a replication engine 631 having control logic 632. The data modules 628D implement compression algorithms 635 for compressing data in conjunction with storage of the data in the storage devices 626. The replication engine 631 and its associated control logic 632 may be implemented at least in part in one or more control modules and/or management modules of the distributed storage controller 628, although such modules are not explicitly shown in the figure. The distributed storage controller 628 may be viewed as corresponding to an instance of storage controller 108 of FIG. 1 or storage controller 508 or 528 of FIG. 5.

The compression algorithms 615 and 635 can include any of a number of well-known algorithms utilized to compress data in storage systems. Such algorithms are therefore not described in detail herein.

In the FIG. 6 embodiment, the first storage system 605 is configured to participate in a replication process with the second storage system 625. The replication process is carried out at least in part by the replication engines 611 and 631 of the respective storage systems 605 and 625 as directed by control logic 612 and 632. Such control logic is an example of what is more generally referred to herein as "replication control logic," although the latter term is intended to be broadly construed and accordingly in some implementations can encompass an entire replication engine such as replication engine 611 or 631. Replication control logic as disclosed herein can be implemented at least in the part in the form of software, possibly in combination with associated hardware and/or firmware.

The data modules 608D of the first storage system 605 are assumed to be configured to implement one or more RAID algorithms that involve compressing data pages in conjunction with storage of the data pages in the storage devices 606 of the first storage system 605. At least a subset of the data modules 608D are each further assumed to comprise one or more caches in which data pages are stored in uncompressed form prior to being compressed for storage in the storage devices 606. The data modules 628D of the second storage system 625 are configured in a similar manner.

As part of the replication process, the replication engine 611 utilizes control logic 612 to request from a given one of the data modules 608D at least one data page to be replicated to the second storage system 625.

For example, replication engine 611 sends a request for one or more data pages, or other type or arrangement of data to be replicated, to the appropriate one of the data modules 608D. The data modules 608D and 628D are referred to as "backend" data modules in this embodiment relative to "frontend" components such as replication engines 611 and 631 that control the replication process.

The operation of the information processing system 600 will now be described in further detail with reference to the flow diagram of the illustrative embodiment of FIG. 7. The process as shown includes steps 700 through 724, and is suitable for use in the system 600 but is more generally applicable to other types of information processing systems, including systems 100 and 500 of respective FIGS. 1 and 5, in which multiple storage systems are configured to participate in a replication process. The steps are illustratively performed by cooperative interaction of replication engines or other arrangements of replication control logic of respective storage controllers in respective source site and target site storage systems, also referred to as respective "source" and "target" in the figure. A given such storage controller in a source site or target site storage system can comprise a distributed storage controller implemented in the manner illustrated in FIG. 1, 5 or 6.

In step 700, the source and target enter a re-synchronization mode. The re-synchronization mode is assumed to be particular mode of a replication process carried out between the source and the target, although in other embodiments, the re-synchronization mode can be implemented as a stand-alone process. The re-synchronization mode may be triggered, for example, due to a detected failure condition in an asynchronous or synchronous replication mode of the replication process, or under other conditions. For example, in the context of a synchronous replication mode, the detected failure condition may comprise a replication failure condition for a given write request, illustratively comprising a failure to receive in a control module of the source an expected response from the target indicating that the given write request has been successfully mirrored to the target.

In step 702, the target receives content-based signatures of respective data pages of a storage object from the source.

In step 704, the target compares at least a portion of a selected one of the content-based signatures for a particular logical address with a particular entry of an address-to-signature table. The particular entry illustratively comprises a logical address and an associated hash handle of the type described elsewhere herein. This comparison therefore utilizes both the logical address and the content-based signature.

In step 706, a determination is made as to whether or not a match is detected in the comparison of step 704. If a match is detected, the process moves to step 708, and otherwise moves to step 714.

In step 708, the target compares the selected content-based signature with the full content-based signature corresponding to the particular entry. The full content-based signature corresponding to the particular entry illustratively comprises a hash digest of the type described elsewhere herein.

In step 710, a determination is made as to whether or not a match is detected in the comparison of step 708. If a match is detected, the process moves to step 712, and otherwise moves to step 714.

In step 712, the target notifies the source that re-synchronization was successful for the data page having the selected content-based signature. The process then moves to step 716.

In step 714, the target notifies the source that re-synchronization was unsuccessful for the data page having the selected content-based signature, and in response the source sends the target the full data content for that data page. The process then moves to step 716.

In step 716, a determination is made as to whether or not there are one or more additional content-based signatures to compare with table entries. Responsive to an affirmative determination, the process moves to step 718, and otherwise moves to step 720.

In step 718, the target selects the next content-based signature for comparison, and then the process returns to step 704 to perform one or more comparisons using that content-based signature in the manner previously described.

In step 720, a determination is made as to whether or not there are one or more additional storage objects to be re-synchronized between source and target. Responsive to an affirmative determination, the process moves to step 722, and otherwise the source and target exit the re-synchronization mode in step 724.

In step 722, the source identifies another storage object, and then the process returns to step 702 to repeat the operations of steps 702 through 718 for that storage object in the manner previously described.

Figure 7:
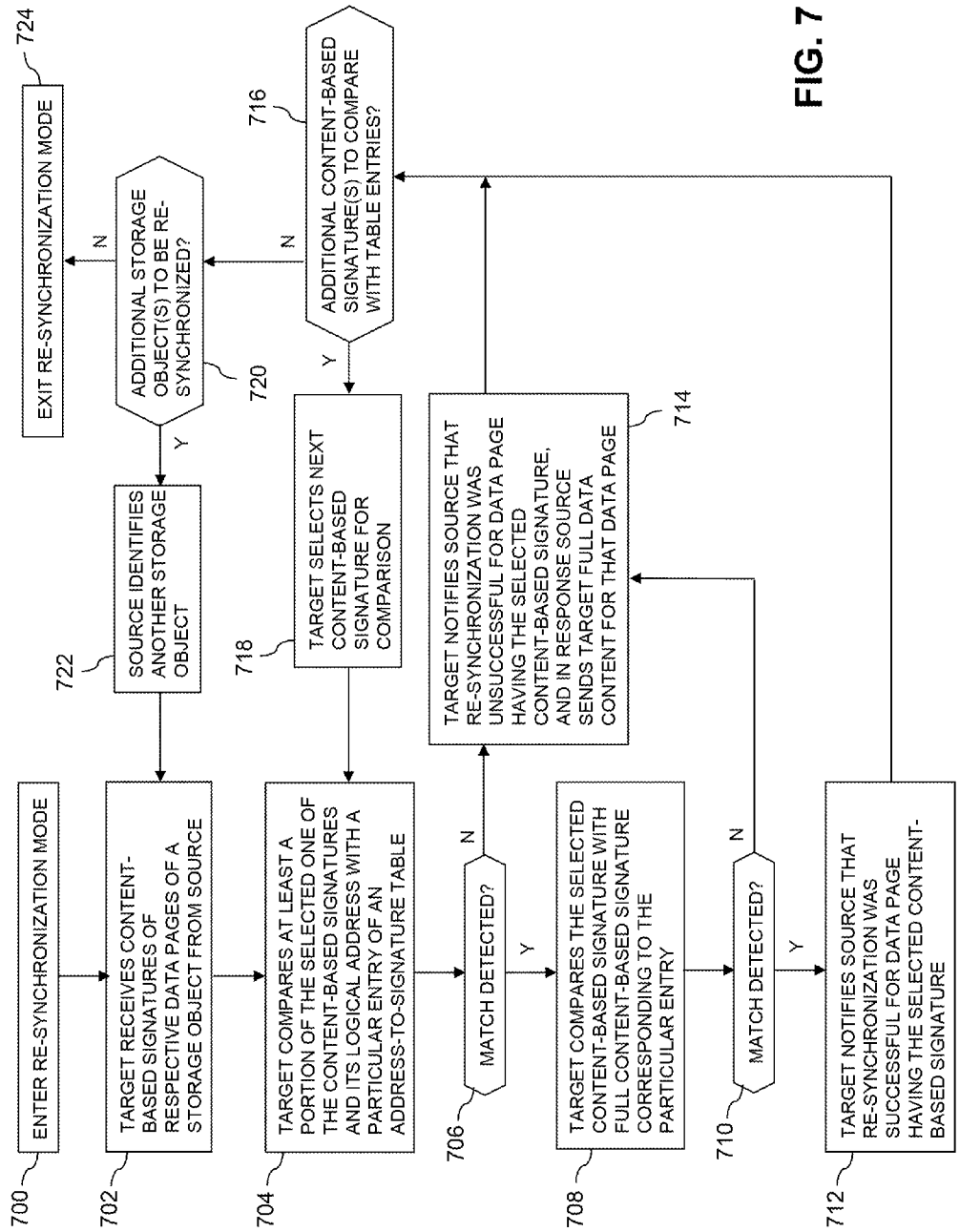
FIG. 7 is a flow diagram of a process for efficient re-synchronization between source and target storage systems in an illustrative embodiment.

Additional re-synchronizations can then be initiated as needed, through iterated performance of respective instances of the FIG. 7 process. It is also to be appreciated that the FIG. 7 process and other features and functionality for efficient re-synchronization as described above can be adapted for use with other types of information systems, including by way of example an information processing system in which source site and target site storage systems are both implemented on the same processing platform.

The particular processing operations and other system functionality described in conjunction with the flow diagram of FIG. 7 are presented by way of illustrative example only, and should not be construed as limiting the scope of the disclosure in any way. Alternative embodiments can use other types of processing operations for implementing efficient re-synchronization. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different re-synchronization processes for respective different sets of replicated data or for different storage systems or portions thereof within a given information processing system.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108, 508, 528, 608 or 628 that is configured to control performance of one or more steps of the FIG. 7 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, 508, 528, 608 or 628, as well as other system components, may be implemented at least in part using processing devices of such processing platforms. For example, in a distributed implementation of the storage controller 108, 508, 528, 608 or 628, respective distributed modules of such a storage controller can be implemented in respective LXCs running on respective ones of the processing devices of a processing platform.

In some embodiments, the first and second storage systems comprise respective XtremIO™ storage arrays suitably modified to incorporate efficient re-synchronization techniques as disclosed herein. As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement re-synchronization functionality using the FIG. 7 process.

The efficient re-synchronization techniques implemented in the embodiments described above can be varied in other embodiments. For example, different types of process operations can be used in other embodiments. Furthermore, although described in some embodiments in the context of data replication from a source to a target, the efficient re-synchronization techniques in other embodiments can be implemented in the context of other types of data transfer within a given storage system or from one storage system to another storage system.

In addition, the above-described functionality associated with C-module, D-module, R-module and SYM module components of an XtremIO™ storage array can be incorporated into other processing modules or components of a centralized or distributed storage controller in other types of storage systems.

Illustrative embodiments of content addressable storage systems or other types of storage systems with efficient re-synchronization functionality as disclosed herein can provide a number of significant advantages relative to conventional arrangements.

For example, some embodiments provide techniques for efficient re-synchronization between source and target storage systems in conjunction with a replication process in an information processing system.

Such embodiments can advantageously provide substantially more efficient re-synchronization than conventional approaches in the presence of one or more replication failure conditions. For example, in some embodiments, excessive changes in reference counts and other metadata are avoided for data pages that are already the same in both source and target storage systems. The amount of time and system resources required for re-synchronization is therefore substantially reduced.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing systems 100, 500 and 600 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 105, 505, 525, 605 and 625, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100, 500 or 600. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments, such as systems 500 and 600.

Figure 8:
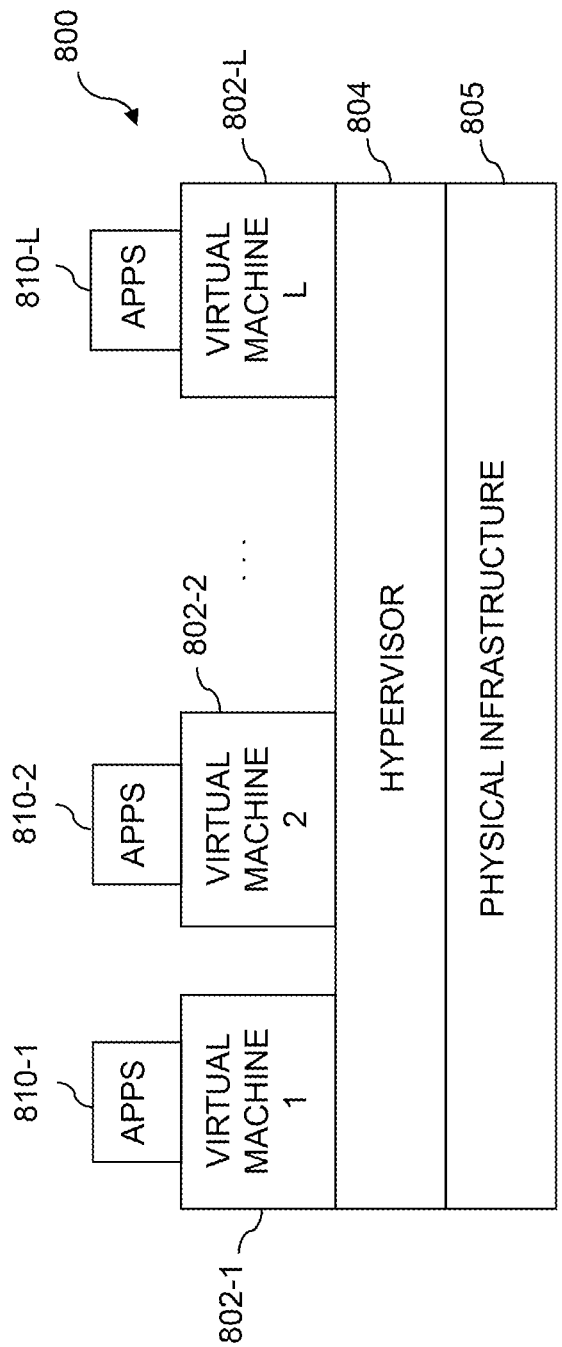
FIGS. 8 and 9 show examples of processing platforms that may be utilized to implement at least a portion of an information processing system in illustrative embodiments.
Figure 9:
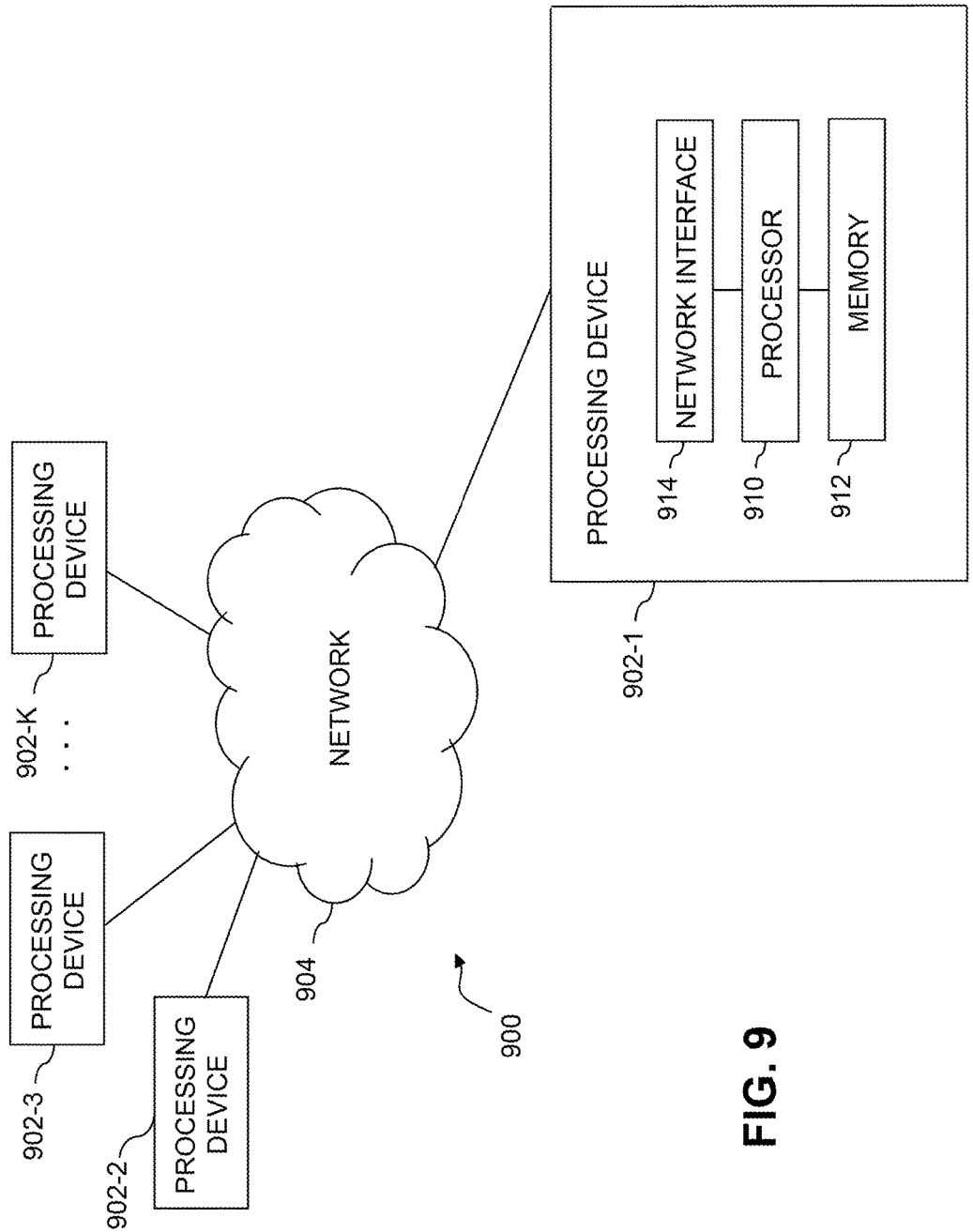

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 804 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 108, 508, 528, 608 and 628 of systems 100, 500 and 600 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, source and target sites, storage systems, storage nodes, storage devices, storage controllers, replication processes, replication engines and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage system being configured to participate as a target storage system in a replication process with a source storage system;
wherein in conjunction with a re-synchronization mode of the replication process, the target storage system is further configured:
to receive from the source storage system a plurality of content-based signatures of respective data pages of a storage object that is subject to replication from the source storage system to the target storage system, the data pages being identified by respective ones of a plurality of logical addresses;
for a given one of the received content-based signatures corresponding to a particular logical address:
to compare a reduced version of the received content-based signature with a particular one of a plurality of entries of an address-to-signature table maintained by the target storage system;
responsive to a match between the reduced version of the received content-based signature and the particular one of the entries of the address-to-signature table, to compare a full version of the received content-based signature with a full version of the content-based signature corresponding to the particular entry; and
responsive to a match between the full version of the received content-based signature and the full version of the content-based signature corresponding to the particular entry, to provide an indication of successful re-synchronization to the source storage system for the storage object data page having the received content-based signature;
wherein the target storage system is implemented using at least one processing device comprising a processor coupled to a memory.

2. The apparatus of claim 1 wherein the source and target storage systems comprise respective content addressable storage systems having respective sets of non-volatile memory storage devices.

3. The apparatus of claim 1 wherein the source and target storage systems are associated with respective source and target sites of the replication process and wherein the source site comprises a production site data center and the target site comprises a disaster recovery site data center.

4. The apparatus of claim 1 wherein the target storage system comprises a plurality of storage nodes each comprising one or more of the storage devices and wherein each of the storage nodes of the target storage system further comprises a set of processing modules configured to communicate over one or more networks with corresponding sets of processing modules on other ones of the storage nodes, the sets of processing modules of the storage nodes of the target storage system collectively comprising at least a portion of the storage controller of the target storage system.

5. The apparatus of claim 4 wherein each of the sets of processing modules comprises one or more control modules, one or more routing modules and one or more data modules, and wherein at least one of the sets of processing modules comprises a management module.

6. The apparatus of claim 5 wherein the address-to-signature table is maintained by one of the control modules, and wherein the full version of the content-based signature corresponding to the particular entry is obtained from one of the data modules.

7. The apparatus of claim 1 wherein the indication of successful re-synchronization is provided to the source storage system for the storage object data page having the received content-based signature without the target storage system updating a reference count maintained in metadata for that content-based signature.

8. The apparatus of claim 1 wherein the target storage system is further configured to provide an indication of unsuccessful re-synchronization to the source storage system for the storage object data page having the received content-based signature, responsive to one of an absence of a match between the reduced version of the received content-based signature and the particular one of the entries of the address-to-signature table and an absence of a match between the full version of the received content-based signature and the full version of the content-based signature corresponding to the particular entry.

9. The apparatus of claim 8 wherein the target storage system receives from the source storage system, responsive to receipt by the source storage system of the indication of unsuccessful re-synchronization for the storage object data page having the received content-based signature, all content of that data page.

10. The apparatus of claim 1 wherein the address-to-signature table maintained by the target storage system comprises at least one address-to-hash table of the target storage system, and wherein entries of the address-to-hash table comprise respective ones of the plurality of logical addresses in association with respective hash handles corresponding to respective ones of the content-based signatures.

11. The apparatus of claim 1 wherein comparing the reduced version of the received content-based signature with the particular one of a plurality of entries of an address-to-signature table maintained by the target storage system is triggered responsive to generation in the target storage system of a local write-via-hash operation for the received content-based signature.

12. The apparatus of claim 11 wherein the generation in the target storage system of the local write-via-hash operation is triggered responsive to receipt of the content-based signature from the source storage system in conjunction with the re-synchronization mode of the replication process.

13. The apparatus of claim 11 wherein the local write-via-hash operation fails and the target storage system provides an indication of unsuccessful re-synchronization to the source storage system for the storage object data page having the received content-based signature, responsive to one of an absence of a match between the reduced version of the received content-based signature and the particular one of the entries of the address-to-signature table and an absence of a match between the full version of the received content-based signature and the full version of the content-based signature corresponding to the particular entry.

14. The apparatus of claim 1 wherein the target storage system is further configured to maintain a counter indicating a number of consecutive successful re-synchronization indications provided for respective ones of the received content-based signatures and to control one or more characteristics of the re-synchronization mode based at least in part on a current value of the counter relative to a designated threshold.

15. A method comprising:

receiving in a target storage system from a source storage system, in conjunction with a re-synchronization mode of a replication process, a plurality of content-based signatures of respective data pages of a storage object that is subject to replication from the source storage system to the target storage system, the data pages being identified by respective ones of a plurality of logical addresses;

for a given one of the received content-based signatures corresponding to a particular logical address, the target storage system:

comparing a reduced version of the received content-based signature with a particular one of a plurality of entries of an address-to-signature table maintained by the target storage system;

responsive to a match between the reduced version of the received content-based signature and the particular one of the entries of the address-to-signature table, comparing a full version of the received content-based signature with a full version of the content-based signature corresponding to the particular entry; and responsive to a match between the full version of the received content-based signature and the full version of the content-based signature corresponding to the particular entry, providing an indication of successful re-synchronization to the source storage system for the storage object data page having the received content-based signature;

wherein the method is implemented by at least one processing device comprising a processor coupled to a memory.

16. The method of claim 15 wherein the indication of successful re-synchronization is provided to the source storage system for the storage object data page having the received content-based signature without the target storage system updating a reference count maintained in metadata for that content-based signature.

17. The method of claim 15 wherein the target storage system maintains a counter indicating a number of consecutive successful re-synchronization indications provided for respective ones of the received content-based signatures and controls one or more characteristics of the re-synchronization mode based at least in part on a current value of the counter relative to a designated threshold.

18. A computer program product comprising a non-transitory processor-readable storage medium having stored therein program code of one or more software programs, wherein the program code when executed by at least one processing device of a target storage system causes the target storage system:

to receive from a source storage system, in conjunction with a re-synchronization mode of a replication process, a plurality of content-based signatures of respective data pages of a storage object that is subject to replication from the source storage system to the target storage system, the data pages being identified by respective ones of a plurality of logical addresses;

for a given one of the received content-based signatures corresponding to a particular logical address:

to compare a reduced version of the received content-based signature with a particular one of a plurality of entries of an address-to-signature table maintained by the target storage system;

responsive to a match between the reduced version of the received content-based signature and the particular one of the entries of the address-to-signature table, to compare a full version of the received content-based signature with a full version of the content-based signature corresponding to the particular entry; and responsive to a match between the full version of the received content-based signature and the full version of the content-based signature corresponding to the particular entry, to provide an indication of successful re-synchronization to the source storage system for the storage object data page having the received content-based signature.

19. The computer program product of claim 18 wherein the indication of successful re-synchronization is provided to the source storage system for the storage object data page having the received content-based signature without the target storage system updating a reference count maintained in metadata for that content-based signature.

20. The computer program product of claim 18 wherein the target storage system maintains a counter indicating a number of consecutive successful re-synchronization indications provided for respective ones of the received content-based signatures and controls one or more characteristics of the re-synchronization mode based at least in part on a current value of the counter relative to a designated threshold.

* * * * *